Jan. 13, 1959
G. CHEREFKO
2,869,033
COURTESY SWITCH SIGNAL
Filed June 12, 1958
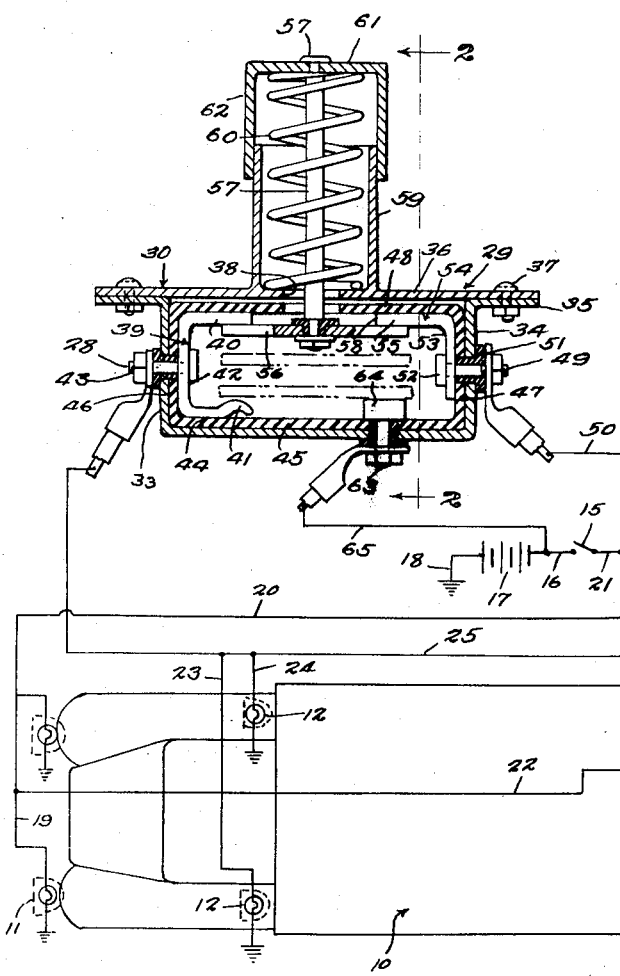
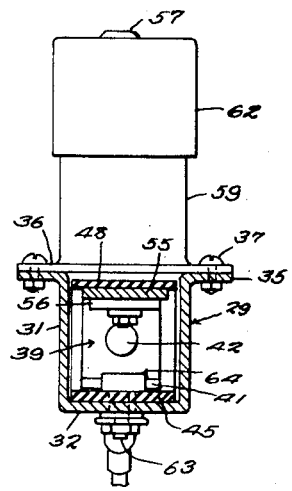
George Cherefko
INVENTOR
BY *Cathrow &Co.*
ATTORNEYS.

United States Patent Office 2,869,033
Patented Jan. 13, 1959

2,869,033

COURTESY SWITCH SIGNAL

George Cherefko, Old Bridge, N. J.

Application June 12, 1958, Serial No. 741,670

2 Claims. (Cl. 315—83)

This invention relates to a switch and a circuit connected with the lights of a vehicle whereby the driver of the vehicle will be able to signal a following vehicle as to the safety for passing.

An object of this invention is to provide in the lighting circuit of a vehicle a switch which is so constructed that it may be placed in a position to be engaged by a foot of the driver on the dashboard, steering column or other convenient or desirable location, in order that the driver may flash at least certain ones of the lights of the vehicle for signaling following or approaching vehicles as to the safety for passing.

Another object of the invention is to provide a safety switch connected with the lighting circuits of the vehicle which will flash lights in the circuits either in the day time when the normal vehicle lights are cut off or at night when the normal vehicle lights are lighted.

With the foregoing and other objects in view which will appear as the description proceeds, the invention consists of certain novel details of construction and combinations of parts, hereinafter more fully described and pointed out in the claims, it being understood that changes may be made in the construction and arrangement of parts without departing from the spirit of the invention as claimed.

Referring to the drawing:

Figure 1 is a vertical section of a passing signal switch constructed according to an embodiment of this invention, showing the switch connected with the lighting circuits of a vehicle, the lighting circuits being shown diagrammatically.

Fig. 2 is a sectional view taken on line 2—2 of Fig. 1.

Referring to the drawing, the numeral 10 designates generally a vehicle which is provided with a pair of front lights 11 and a second pair of front and body lights 12. The vehicle 10 is also provided with a rear pair of lights 13 and an intermediate light 14. The lights 11, 12, 13 and 14 have one side thereof grounded in a lighting electric circuit and the other side of the lights are connected as will be hereinafter described, to a lighting switch 15. The switch 15 is connected by a conductor 16 to one side of a battery 17 and the other side of the battery 17 is grounded as by a conductor 18. The front fender lights 11 have the other side thereof connected by means of a conductor 19 and conductor 19 is connected as by means of a conductor 20 to a conductor 21 which is connected to one side of the switch 15. The intermediate rear light 14 is connected as by conductor 22 to conductor 19 so that when switch 15 is closed lights 11 and 14 will be lighted. The body lights 12 are connected as by conductors 23 and 24 to a conductor 25 and the rear pair of lights 13 are connected by conductors 26 and 27 to conductor 25. Conductor 25 is connected to a terminal post 28 which is carried by a switch, generally indicated at 29 which is constructed according to an embodiment of this invention. The switch 29 is formed of a housing generally indicated at 30, and the housing 30 includes vertical side walls 31, a bottom wall 32, opposite end walls 33 and 34 and an upper horizontal flange 35.

A top plate 36 is secured by fastening means 37 to the upper flange 35 and plate 36 is formed with a central opening 38, the purpose for which will be hereinafter described. The housing 30 may be formed of metal or other suitable material and secured to the floor of the vehicle in a position for engagement by a foot of the driver. The housing 30 has mounted therein a U-shaped contact member 39 which is formed with an upper contact 40 and a lower contact 41. The bight of the U-shaped member 39 is connected with the terminal 28, the latter extending through the end wall 33, and provided with a head 42 at its inner end, bearing against the bight of the contact member 39. The terminal 28 is insulated from the wall 33 by means of an insulating sleeve 43. The interior of the housing 30 is provided with a substantially rectangular insulating liner 44 which includes a cam insulating member 45, end insulating members 46 and 47 and a top insulating member 48. The housing 30 also includes a second terminal 49 secured to the end wall 34 and connected by means of a conductor 50 to conductor 21. Terminal 49 is insulated from end wall 34 by means of insulation 51 and the inner end of the terminal 49 is provided with a head 52 bearing against the vertical side 53 of an inverted L-shaped contact member 54. The upper arm 55 of L-shaped member 54 is disposed beneath the top insulating member 48 and is disposed in the position confronting and faced with respect to contact member 40. The bridging bar 56 is secured to a bolt 57 which loosely engages through opening 58 in insulating member 48 and extends upwardly through opening 38 into a tubular housing 59. The housing 59 is secured to the top wall 36 of housing 30 and a spring 60 within housing 59 bears at its lower end against the top wall 36 and bears at its lower end against a cap wall 61 which is formed with a cylindrical skirt 62 telescoping over the housing 59.

The switch 29 also includes a bottom terminal 63 having an inner contact member 64 spaced from contact member 40. Terminal 63 is connected by means of a conductor 65 to wires 16 between switch 15 and battery 17. Spring 60 further holds bridging member 56 in an upper position in circuit closing contact with contact members 40 and 55. In the normal position of bridging member 56 when switch 15 is closed the electric circuit to lights 12 and 13 will be closed and circuit to lights 11 and 14 will also be closed. When the driver of the vehicle desires to signal to an approaching or following vehicle that it is safe to pass cap 61—62 is pressed downwardly to break the circuit to lights 12 and 13. At this time lights 11 and 14 will remain lighted so that the instant vehicle will not be in the dark at any time. The switch 29 can be pressed and released a number of times so as to flash both front and rear lights and thereby give an appropriate safe signal to the following vehicle.

In the day time when switch 15 is open lights 12 and 13 may be flashed by pressing bridging member 56 downwardly to its limit of movement and into engagement with contacts 41 and 64. This operation may be performed rapidly so as to flash lights 12 and 13.

With a switch as hereinbefore described, both following and approaching vehicles may be signaled as to the safety of passing the instant vehicle and this signaling is accomplished either in the day time or at night.

What is claimed is:

1. In a vehicle having a pair of lighting circuits, a rear pair of lights in one of said circuits, an intermediate pair of lights in said one circuit, a front pair of lights in the other of said circuits, an intermediate rear light in said other circuit, a main light switch connected to both circuits and to a power source, a second switch including a pair of contacts connected to said one circuit between said switch and said rear and intermediate pair of lights, a spring pressed bridging member normally engaging said pair of contacts, a second pair of contacts spaced from said first pair of contacts, one of said second pair of contacts being integral with one member of said first pair of contacts, a conductor connecting the other member of said pair of contacts to said other circuit between said first switch and said source, movement of said bridging member into engagement with said second pair of contacts effecting closing of said second circuit.

2. A spring-pressed switch for interposing in a pair of light circuits comprising a housing formed of opposite side and end walls, and top and bottom walls, a U-shaped contact member in said housing, one side of said U-shaped member being uppermost and the other side lowermost, an inverted L-shaped contact member having one side uppermost and spaced from the upper side of said U-shaped member, a lower contact carried by said bottom wall and spaced from the lower side of said U-shaped contact member, a bridging member in said housing, a bolt fixed to said bridging member and loosely extending through said top wall, a cylindrical member fixed to said top wall and loosely engaging about said bolt, a cap fixed to the upper end of said bolt and slidably engaging over said cylindrical member, and a spring about said bolt bearing at one end against the top wall and at the other end bearing against said cap to normally hold said bridging member in engagement with said upper sides of said U-shaped and L-shaped contacts, downward movement of said bridging member bridging said lower contact and said other side of said U-shaped contact.

References Cited in the file of this patent

UNITED STATES PATENTS

| | | |
|---|---|---|
| 1,269,954 | Nigh | June 18, 1918 |
| 1,316,372 | Liebreich | Sept. 16, 1919 |
| 2,659,838 | Du Rocher | Nov. 17, 1953 |
| 2,661,400 | Gandelot | Dec. 1, 1953 |
| 2,809,262 | Protz | Oct. 8, 1957 |

FOREIGN PATENTS

| | | |
|---|---|---|
| 202,980 | Australia | Aug. 9, 1956 |